(12) United States Patent
Sorrentino et al.

(10) Patent No.: US 9,106,276 B2
(45) Date of Patent: Aug. 11, 2015

(54) METHOD AND APPARATUS FOR REFERENCE SIGNAL TRANSMISSION AND RECEPTION

(71) Applicant: Telefonaktiebolaget L M Ericsson (publ), Stockholm (SE)

(72) Inventors: Stefano Sorrentino, Solna (SE); Havish Koorapaty, Saratoga, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 120 days.

(21) Appl. No.: 14/110,846

(22) PCT Filed: Aug. 13, 2013

(86) PCT No.: PCT/SE2013/050967
§ 371 (c)(1),
(2) Date: Oct. 9, 2013

(87) PCT Pub. No.: WO2014/027948
PCT Pub. Date: Feb. 20, 2014

(65) Prior Publication Data
US 2014/0198763 A1 Jul. 17, 2014

Related U.S. Application Data

(60) Provisional application No. 61/682,614, filed on Aug. 13, 2012.

(51) Int. Cl.
*H04B 7/02* (2006.01)
*H04L 5/00* (2006.01)

(52) U.S. Cl.
CPC .............. *H04B 7/024* (2013.01); *H04L 5/0035* (2013.01); *H04L 5/0048* (2013.01)

(58) Field of Classification Search
CPC ...... H04B 7/204; H04L 5/0048; H04L 5/0035
See application file for complete search history.

(56) References Cited

U.S. PATENT DOCUMENTS

| 2013/0083780 | A1* | 4/2013 | Luo et al. ...................... 370/336 |
| 2013/0195070 | A1* | 8/2013 | Bashar et al. ................. 370/330 |
| 2013/0294271 | A1* | 11/2013 | Nagata et al. ................. 370/252 |
| 2014/0022988 | A1* | 1/2014 | Davydov et al. .............. 370/328 |

(Continued)

OTHER PUBLICATIONS

Author Unknown, "Discussions on quasi-co-located antenna ports," New Postcom; 3GPP TSG RAN WG1 Meeting #70; R1-123440; Aug. 13-17, 2012. pp. 1-3. Qingdao, China.

(Continued)

*Primary Examiner* — Albert T Chou
(74) *Attorney, Agent, or Firm* — Murphy, Bilak & Homiller, PLLC

(57) ABSTRACT

In one aspect, the teachings herein disclose methods and apparatuses for improved reference signal reception in a wireless device configured for operation in a wireless communication network. In one embodiment, the network provides assistance information that indicates a received timing or frequency offset of a second reference signal relative to a first reference signal that is transmitted from a first antenna port. The second reference signal is transmitted by the wireless communication network from a second antenna port that is quasi co-located with the first antenna port with respect to timing, frequency and/or delay spread, and the wireless device is configured to use the assistance information to configure its receiver timing and/or frequency offset for reception of the second reference signal. Such operation reduces the "search" space in time and/or frequency needed at the wireless device, thereby improving and simplifying reception of the second reference signal.

22 Claims, 10 Drawing Sheets

(56) References Cited

U.S. PATENT DOCUMENTS

2014/0270024 A1* 9/2014 Papadimitriou .............. 375/355
2015/0023265 A1* 1/2015 Park et al. .................... 370/329

OTHER PUBLICATIONS

Author Unknown, "Discussion on antenna ports collocation," Huawei, HiSilicon; 3GPP TSG RAN WG1 Meeting #70; R1-123124; Aug. 13-17, 2012. pp. 1-10. Qingdao, China.

Author Unknown, "Draft LS response on reference scenarios for antenna ports quasi co-location," Ericsson, [TSG RAN WG1]; 3GPP TSG RAN WG1 Meeting #70; R1-123745; Aug. 13-17, 2012; pp. 1-2. Qingdao, China.

Author Unknown, "Discussion on geographically separated antennas," Huawei, HiSilicon; 3GPP TSG-RAN WG4 Meeting #64; R4-124283; Aug. 13-17, 2012; pp. 1-8; Qingdao, China.

* cited by examiner

US 9,106,276 B2

METHOD AND APPARATUS FOR REFERENCE SIGNAL TRANSMISSION AND RECEPTION

TECHNICAL FIELD

The present invention generally relates to wireless communication networks and particularly relates to reference signals associated with antenna ports in such networks.

BACKGROUND

Ongoing specification work by the Third Generation Partnership Project, 3GPP, includes, among other things, a focus on improving support for heterogeneous network operations and other multi-point scenarios, such as Coordinated Multi-Point, CoMP networks. As will be appreciated by those skilled in the art, Long Term Evolution, LTE, networks use Orthogonal Frequency Division Multiplexing, OFDM, in the downlink and Discrete Fourier Transform, DFT, spread OFDM in the uplink.

An OFDM carrier comprises a plurality of spaced-apart narrowband carriers, often referred to as subcarriers, each of which can be individually modulated in each OFDM symbol interval. Each subcarrier within a given OFDM symbol time thus represents a "resource element" and the overall OFDM carrier thus can be seen as a time-frequency grid of individual resource elements. More particularly, each resource element corresponds to one subcarrier during one OFDM symbol interval on a particular "antenna port" of a transmitting base station. Here, an antenna port is defined such that the channel over which a symbol on the antenna port is conveyed can be inferred from the channel over which another symbol on the same antenna port is conveyed. There is one OFDM resource grid per antenna port.

LTE "broadcasts" control messages to user equipments, UEs, using the Physical Downlink Control Channel or PDCCH. PDCCH transmissions occur in the first one to four OFDM symbol intervals in each OFDM subframe, where there are ten OFDM subframes per OFDM frame. OFDM frames are ten milliseconds long, hence each subframe spans one millisecond and includes two slots of one-half millisecond per slot. In LTE, the subframe represents one Transmission Time Interval or TTI, and is the unit of scheduling. Cell specific Reference Signals or CRS are transmitted across the OFDM bandwidth and allow UEs to perform channel estimation for PDCCH reception, regardless of their location relative to the antenna port(s) used for PDCCH/CRS transmissions.

More recently, LTE has been extended to include "enhanced" control channels, such as the enhanced PDCCH, which is referred to as the EPDCCH or the ePDCCH. These enhanced control channels are UE-specific and demodulation of them at the targeted UEs relies on the use of UE-specific Demodulation Reference Symbols or DMRS, which are transmitted from the same antenna port, or, more generally, the same transmission point as used for transmitting the ePDCCH for a given UE. By transmitting DMRS from the individual transmission points used for transmitting user-specific control information, the targeted UEs are able to estimate the channel with respect to those individual transmission points. DMRS also serve the same purpose for multi-point data transmissions, such as used in CoMP.

In more detail, CoMP transmission techniques introduce dependencies in the scheduling or transmission/reception among different transmission points, in contrast to conventional cellular systems where a point from a scheduling point of view is operated more or less independently from the other points. DL CoMP operations may include, e.g., serving a certain UE from multiple points, either at different time instances or for a given subframe, on overlapping or not overlapping parts of the spectrum. Dynamic switching between transmission points serving a certain UE is often termed as DPS (dynamic point selection). Simultaneously serving a UE from multiple points on overlapping resources is often termed as JT (joint transmission). The point selection may be based, e.g., on instantaneous conditions of the channels, interference or traffic. CoMP operations are intended, for example, for data channel transmissions, such as on the Physical Downlink Shared Channel, PDSCH, used in LTE and/or control channel transmissions, such user-specific ePDCCH transmissions in LTE.

The introduction of user-specific DMRS complicates channel estimation and corresponding signal reception in, the UEs, as individual UEs must perform channel estimation using a potentially smaller set of DMRS, which by their nature are not as dense or numerous within the OFDM grid as CRS or other common reference signals. As a further complication, further revisions of LTE or other evolving network standards may introduce new carrier types, which may not carry all or the same reference signals as the currently defined carrier types. For example, a new carrier type may replace the CRS with a "reduced" CRS port that is transmitted with reduced periodicity in time and with a reduced bandwidth. The bandwidth of the reduced CRS port may also be configurable. In another example, a new carrier is transmitted in synchronization with a legacy carrier, in a carrier-aggregated mode. In this synchronized carrier case, the new carrier may not transmit the Primary and Secondary Synchronization Signals, PSS and CSS, and/or the CRS, which are provided in the legacy carrier for use by UEs in synchronizing with the legacy carrier and making corresponding channel estimates.

Broadly, whether in CoMP or other network arrangements, different reference signals may be transmitted from different antenna ports and those ports may be geographically separated. Geographical separation of ports implies that instantaneous channel coefficients from each port towards a given wireless device are in general different. Furthermore, even the statistical properties of the channels for different antenna ports and different reference signal types may be significantly different. Examples of such statistical properties include the received power for each port, the delay spread, the Doppler spread, the received timing (i.e., the timing of the first significant channel tap), the number of significant channel taps, the frequency shift.

As a general proposition in LTE, for example, a wireless device cannot make any assumptions about the properties of the channel corresponding to a given antenna port based on the properties of the channel of another antenna port. This independence is in fact a key part of maintaining transmission transparency with respect to the wireless devices operating within an LTE network. The wireless device, in general, thus needs to perform an independent estimation for each reference signal port of interest, for a given transmission. But this arrangement can result in occasionally inadequate channel estimation quality for certain reference signal ports, and that inadequacy may lead to undesirable link and system performance degradation. For example, the network in question may configure a wireless device to use CRS, DMRS, and/or Channel State Information Reference Signals, CSI-RS, for estimation of propagation parameters and/or for generating link adaptation feedback, to aid the reception of other signals.

SUMMARY

In one aspect, the teachings herein disclose methods and apparatuses for improved reference signal reception in a wireless device configured for operation in a wireless communication network. In one embodiment, the network provides assistance information that indicates a received timing or frequency offset of a second reference signal relative to a first reference signal that is transmitted from a first antenna port. The second reference signal is transmitted by the wireless communication network from a second antenna port that is quasi co-located with the first antenna port with respect to timing, frequency, Doppler spread and/or delay spread, and the wireless device is configured to use the assistance information to configure its receiver timing and/or frequency offset for reception of the second reference signal. Such operation reduces the "search" space in time and/or frequency needed at the wireless device, thereby improving and simplifying reception of the second reference signal.

An example method of reference signal reception in a wireless device configured for operation in a wireless communication network includes receiving a first reference signal that is transmitted by the network from a first antenna port, and receiving assistance information from the wireless communication network that indicates a received timing or frequency offset of a second reference signal relative to the first reference signal. The second reference signal is transmitted by the network from a second antenna port that is quasi co-located with the first antenna port with respect to timing, frequency and/or delay spread. Correspondingly, the method includes configuring a receiver timing or frequency offset at the wireless device for reception of the second reference signal, according to the assistance information, and receiving the second reference signal according to the configured receiver timing or frequency offset.

An example wireless device includes radio circuitry configured to transmit signals to the network and to receive signals from the network, including a first reference signal transmitted by the network from a first antenna port and a second reference signal transmitted by the network from a second antenna port that is quasi co-located with the first antenna port. The example device further includes processing circuitry that is operatively associated with a memory and with the radio circuitry. The processing circuitry is configured to perform processing operations or steps to implement the above method, or variations of it.

On the network side, an example method of facilitating reference signal reception by a wireless device operating in a wireless communication network includes determining a received timing or frequency offset relating a second reference signal to a first reference signal. Here, the first reference signal is transmitted from a first antenna port in the network and the second reference signal is transmitted from a second antenna port in the network that is quasi co-located with the first antenna port, and the method includes generating assistance information indicating the received timing or frequency offset for the second reference signal. The method continues with transmitting the assistance information to the wireless device, thereby enabling the wireless device to configure a receiver timing or frequency offset used by the wireless device for reception of the second reference signal, according to the assistance information.

In a related example embodiment, a network node is configured for, operation in a wireless communication network and includes radio circuitry that is configured for sending signals to a wireless device and receiving signals from the wireless device, and further includes processing circuitry that is operatively associated with the radio circuitry. In particular, the processing circuitry is configured to perform the operations or steps corresponding to the above-described network method, or variations of that method.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
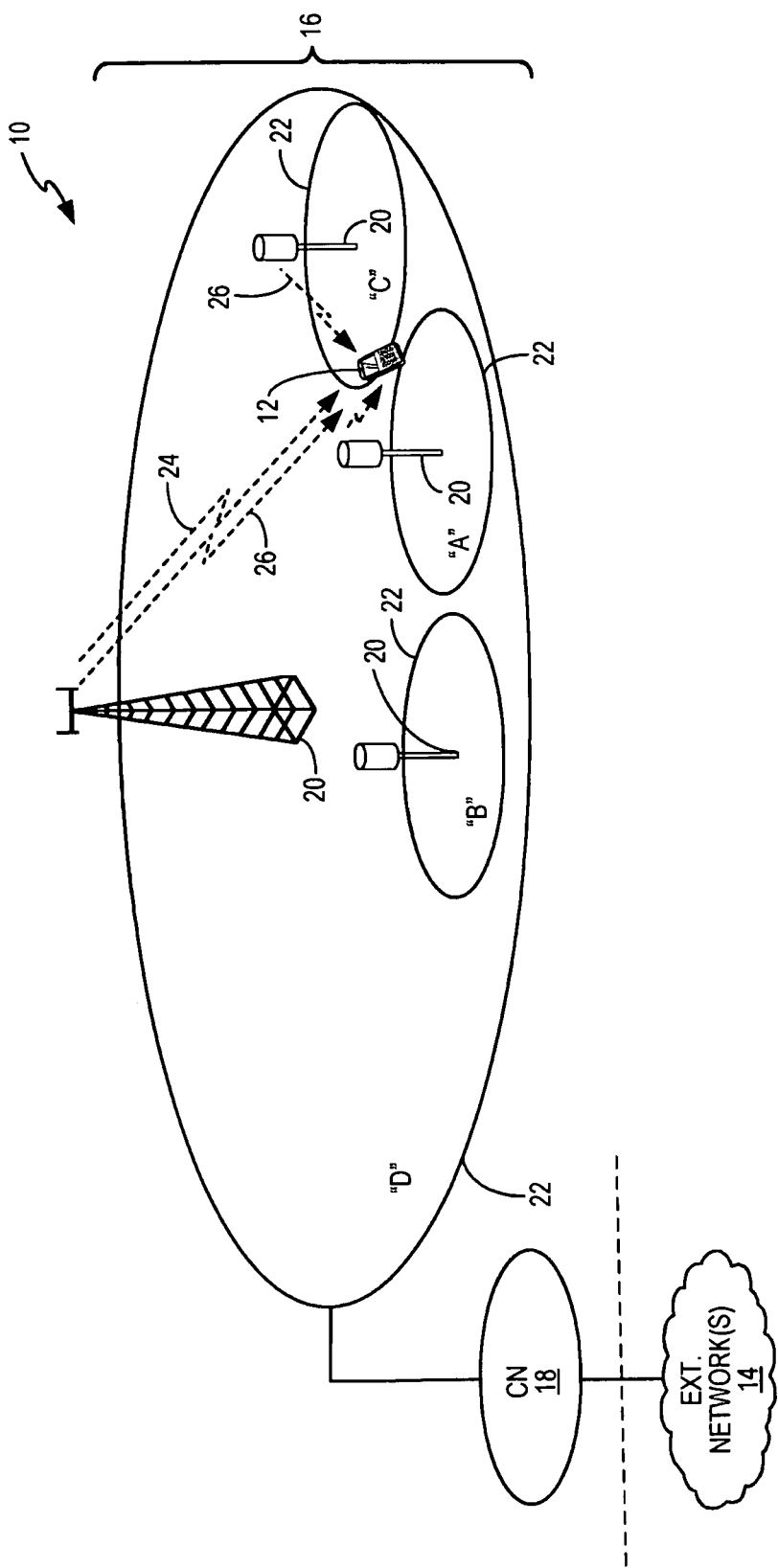
FIG. 1 is a block diagram of one embodiment of a wireless communication network that includes a network node and a wireless device configured according to the teachings herein.

This disclosure recognizes that, even though in general the channel from each antenna port to each wireless device receiver port is substantially unique, some statistical properties and propagation parameters may be common or similar among different antenna ports, depending, for example, on whether the different antenna ports originate from the same transmission point or not. Common properties include, for example, the received power level for each port, the delay spread, the Doppler spread, the received timing, i.e., the timing of the first significant channel tap, and the frequency shift.

This recognition is exploited in the form of improved reference signal reception at wireless devices, based on the network in question providing certain assistance information regarding "quasi co-located" antenna ports, and further based on an appropriately-configured wireless device using the assistance information to improve its reception of reference signals from a given antenna port that is quasi co-located with another antenna port. To better understand such operations, consider that typical channel estimation algorithms perform a three-step operation. A first step consists of the estimation of some of the statistical properties of the channel. A second step consists of generating an estimation filter based on such parameters. A third step consists of applying the estimation filter to the received signal in order to obtain channel estimates. The filter may be equivalently applied in the time or frequency domain. Some channel estimator implementations may not be based on the three steps method described above, but still exploit the same principles.

Accurate estimation of the filter parameters in the first step leads to improved channel estimation. Even though it is often in principle possible for the wireless device to obtain such filter parameters from observation of the channel over a single subframe and for one reference signal port, it is possible for the wireless device to improve the filter parameter estimation accuracy by combining measurements associated with reference signals from more than one antenna port, at least where those antenna ports have one or more statistical properties that are the same or similar. Such ports are referred to herein as being quasi co-located, to denote that they have one or more shared or related statistical properties, irrespective of whether they are physically co-located.

While the transparency of transmission points from the perspective of wireless devices means that conventional wireless devices operating in conventional networks do not have any mechanism to exploit quasi co-located ports for improved reception of reference signals from such ports, it is recognized herein that a network has, or can be configured to have, knowledge of which antenna ports are quasi co-located, and further to have knowledge of the particular relationship between the statistical properties of one antenna port and another. In this respect, it will be understood that the network "knows" how the various antenna ports are mapped to corresponding physical transmission points.

Consider the wireless communication network 10 shown by way of non-limiting example in FIG. 1. The wireless communication network 10—hereafter "network 10"—provides communication services to a potentially large plurality of wireless devices 12, although for simplicity only one such device is illustrated. Typical services include communicatively coupling individual ones of the wireless devices 12 to other devices within the network 10 and/or to other devices or systems reachable in one or more external networks 14. As a non-limiting example, the network 10 provides IP-based packet connectivity to one or more external packet data networks.

In the depicted arrangement, the network 10 includes a Radio Access Network, RAN, 16, and an associated Core Network, CN, 18. These depictions are simplified to ease the discussion. For example, the RAN 16 is shown with a small number of base stations 20 and corresponding cells 22. Here, a "cell" represents a given area of radio service coverage using a given allocation of radio resources—e.g., a particular carrier over a particular service area within the overall coverage area of the network 10.

Although not limiting, the arrangement depicted in FIG. 1 is interesting, in that the network 10 is shown according to a heterogeneous network deployment, wherein one or more of the cells 22 are "macro" cells having relatively large coverage area, as compared to one or more other ones of the cells 22. The smaller ones of the cells 22 often are referred to as "pico" or "micro" cells and they can be used to overlay the larger, macro cells to provide enhanced data rates, fill in coverage gaps, etc. It will be understood that the base stations 20 used to provide macro cell service generally will be more complex, or at least more powerful, than the base stations 20 used to provide micro cell service. Indeed, while the reference number "20" is used for all base stations 20 depicted in FIG. 1, it will be appreciated that in heterogeneous network deployments, the base stations 20 serving micro cells may have a different construction and/or may use different Radio Access Technologies, RATs, as compared to the base stations serving macro cells.

The base station particulars, however, are of less interest than the fact that the example arrangement in FIG. 1 illustrates that a given wireless device 12 may be served from multiple, different transmission points. For example, in one configuration, the cell 22 labeled "D" in the diagram is a macro cell having an assigned Physical Cell. Identifier or PCI, and the remaining cells "A", "B", and "C" share that same identifier and thus operate more as distributed transmission points within the larger cell "D". Different antenna ports map to different ones of these transmission points, and the teachings herein can be used to provide assistance information to the wireless device 12, indicating the quasi co-location relationships, if any, between various ones of the reference signals transmitted from the different transmission points.

Of course, these same teachings are applicable to variations of the network 10, such as where each depicted cell 22 has a unique PCI within the network 10. Further, the same teachings apply to CoMP deployments, where dynamically selected subsets of cells within a cluster of cells may be used to serve the wireless device 12, and to multi-carrier arrangements, such as Carrier Aggregation, CA, involving a Primary Component Carrier, PCC, and one or more Secondary Component Carriers, SCC.

FIG. 1 alludes to all such arrangements by depicting a first reference signal 24 and a second reference signal 26. Both such signals may be transmitted from the same transmission point, e.g., from the base station 20 in cell D. But the more interesting case arises when the two reference signals 24 and 26 are not transmitted from the same transmission point. FIG. 1 illustrates possible examples, where the wireless device 12 receives the first reference signal from cell D or cell A, and receives the second reference signal 26 from cell C. In one particular but non-limiting example, the first reference signal comprises CRS transmitted over a macro area from the base station 20 of cell D, while the second reference signal comprises CSI-RS transmitted from one of the overlay cells A, B or C.

Figure 2:
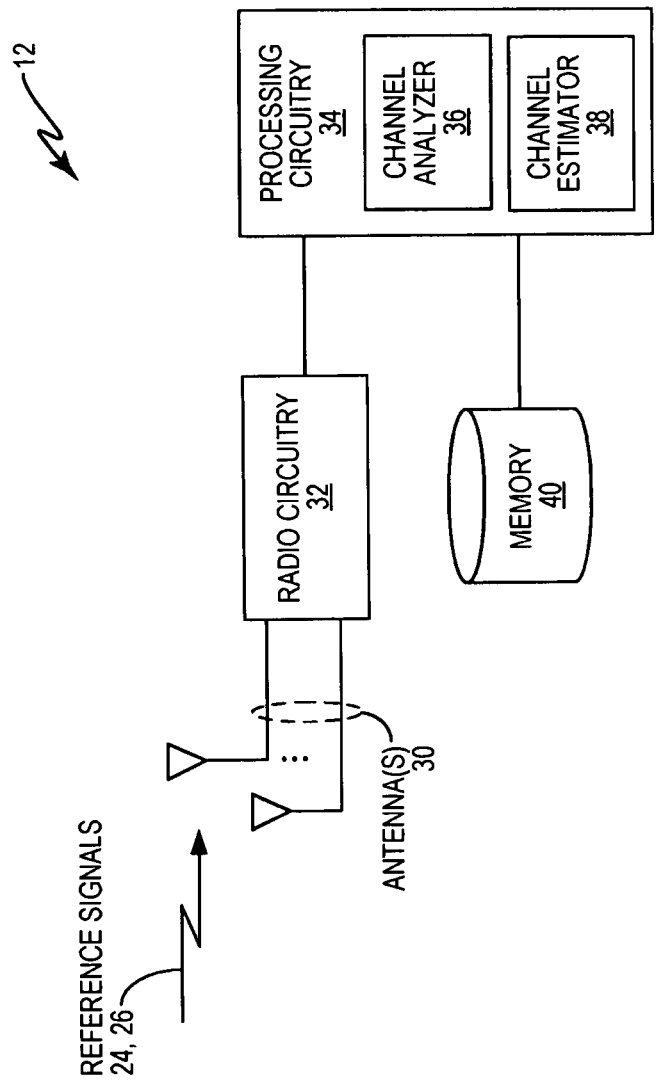
FIG. 2 is a block diagram of one embodiment of a wireless device that is configured to receive assistance information and to use the received assistance information to facilitate reception of a reference signal of interest.

Now consider the example wireless device 12 shown in FIG. 2, referred to as "the device 12." The device 12 includes one or more receive/transmit antennas 30, radio circuitry 32, and processing circuitry 34, which includes, at least in terms of functional processing circuitry, a channel analyzer 36 and a channel estimator 38. The processing circuitry 34 further includes or is associated with memory 40, which may comprise more than one type of memory.

The radio circuitry 32 is configured to transmit signals to the network 10 and to receive signals from the wireless communication network 10, including a first reference signal 24 transmitted by the network 10 from a first antenna port and a second reference signal 26 transmitted by the network 10 from a second antenna port that is quasi co-located with the first antenna port. Correspondingly, the processing circuitry 34 is operatively associated with the memory 40 and with the radio circuitry 32 and is configured to perform a number of operations or processing actions.

In particular, the processing circuitry 34 is configured to receive assistance information from the network 10 that indicates a received timing or frequency offset of the second reference signal 26 relative to the first reference signal 24, and to configure a receiver timing or frequency offset used by the radio circuitry 32 for reception of the second reference signal 26, according to the assistance information. Further, the processing circuitry is configured to receive the second reference signal 26 via the radio circuitry 32, according to the configured receiver timing or frequency offset. Specifically, the receiver may adjust the oscillator frequency in the device by the frequency offset amount indicated by the network to receive the second reference signal and estimate parameters based on it. Alternately, the receiver may use the same oscillator frequency that is used for receiving the first reference signal but perform a phase rotation of the received samples in baseband before receiving the second reference signal and estimating parameters. For timing, the receiver may adjust the placement of its search window for receiving the second reference signal using the information from the network so that the number of multipath components from the second reference signal that can be captured within the search window are maximized. In one sense, then, the processing circuitry 34 can be understood as improving its reception of the second reference signal 26 by using the added knowledge gained via the assistance information to reduce the search space in time and/or frequency used for detecting and receiving the second reference signal. Such operation eliminates or reduces "blind detection" of the second reference signal 26 by the device 12.

In an example case, the second reference signal 26 comprises CSI-RS that are transmitted from the second antenna port. In the same or another example, the first reference signal 24 comprises one of CRS, a Primary Synchronization Signal, PSS, or a Secondary Synchronization Signal, SSS. Further, in at least some embodiments, the wireless device 12 is configured to receive the first reference signal 24 on a first carrier and receive the second reference signal 26 on a second carrier that is different than the first carrier.

The assistance information from the network 10 includes, for example, a timing range value or a frequency range value. Correspondingly, the processing circuitry 34 is configured to configure the receiver timing or frequency offset at the device 12 according to the assistance information, by using the timing range value to dimension a search window for detection of the second reference signal 26, around the received timing of the first reference signal 24, or by using the frequency range value to dimension frequency detection of the second reference signal 26, around the received frequency of the first reference signal 24.

In one example, the assistance information indicates any one or more of the following: the received timing of the second reference signal 26 in terms of the first significant channel tap associated with the second reference signal 26 and/or the number of significant channel taps associated with the second reference signal 26; and a frequency shift relating the first and second reference signals 24 and 26.

In a further example, the secondary reference signal comprises CSI-RS and is transmitted on a carrier that includes one or more of CRS, a PSS, and an SSS. Advantageously, the network 10 may be configured to send an indication of this scenario to the device 12, and the processing circuitry 34 in such an embodiment is configured respond to such indication by selecting at the wireless device 12 any one or more of the CRS, PSS and SSS as the first reference signal 24, for use in relating the assistance information to the CSI-RS.

In another example, the second reference signal 26 comprises CSI-RS that is transmitted on a second carrier that lacks a PSS or SSS or CRS. The network 10 is configured to send an indication of this scenario to the device 12 and, advantageously, the processing circuitry 34 is configured to respond to such indication by selecting at the device 12 a reference signal from a first carrier that is aggregated with the second carrier and is known or assumed by the wireless device 12 to be synchronized with the second carrier. Such an assumption is made by the device 12 when timing and frequency offset is not explicitly included in the received assistance information.

Figure 3:
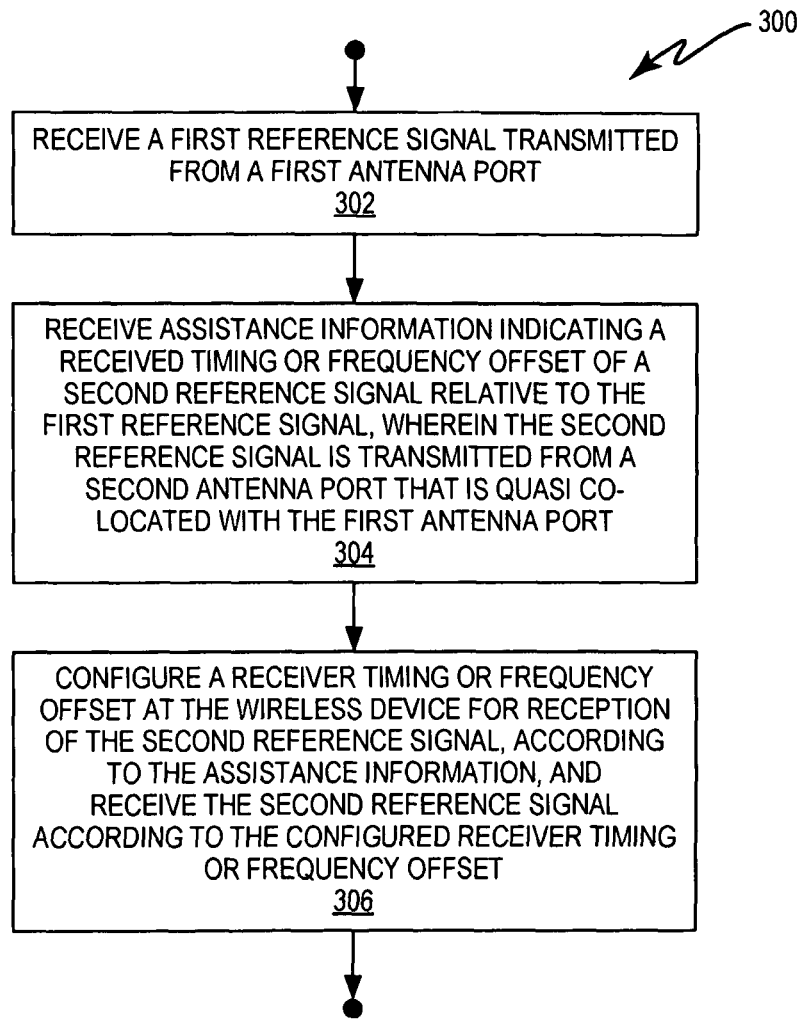
FIG. 3 is a logic flow diagram of one embodiment of a method of reference signal reception processing at a wireless device.

The method 300 depicted in FIG. 3 provides an outline of example processing at the device 12. Although the illustration may suggest a particular ordering of processing actions or steps, it will be understood that one or more processing operations may be performed in a different order than suggested, or performed in parallel, or performed along with other device processing. Further, it should be understood that the method 300 may be repeated as needed, e.g., based on mobility events, the receipt of new assistance information, etc., and may be applied to different pairings of reference signals. Still further, the method 300 and other flow charts and/or processing diagrams illustrated herein may be implemented in hardware and/or software. For example, programmable circuitry, such as a general purpose computer or processor, may be configured via execution of a computer program, software, or firmware tangibly embodied in a computer-readable storage medium.

With these points in mind, the example method 300 includes receiving (Block 302) a first reference signal 24 that is transmitted by the network 10 from a first antenna port. The method 300 further includes receiving (Block 304) assistance information from the network 10 that indicates a received timing or frequency offset of a second reference signal 26 relative to the first reference signal 24. Here, the second reference signal 26 is transmitted by the network 10 from a second antenna port that is quasi co-located with the first antenna port, with respect to timing, frequency, delay spread and/or Doppler spread. Thus, the method 300 further includes configuring (Block 306) a receiver timing or frequency offset at the wireless device 12 for reception of the second reference signal 26, according to the assistance information, and receiving the second reference signal 26 according to the configured receiver timing or frequency offset. The measured delay spread on the first reference signal can be used along with the timing offset to determine the search window for the second reception signal so that the number of multipath components captured within it is maximized. Similarly, the measured Doppler spread on the first reference signal can be used along with the frequency offset to determine a search window in frequency that maximizes the energy received from the second reference signal. The frequency offset would indicate the location of the midpoint of this search window in frequency for the second reference signal compared to the first reference signal and the measured Doppler spread on the first reference signal would determine the width of the search window around this midpoint.

Figure 4:
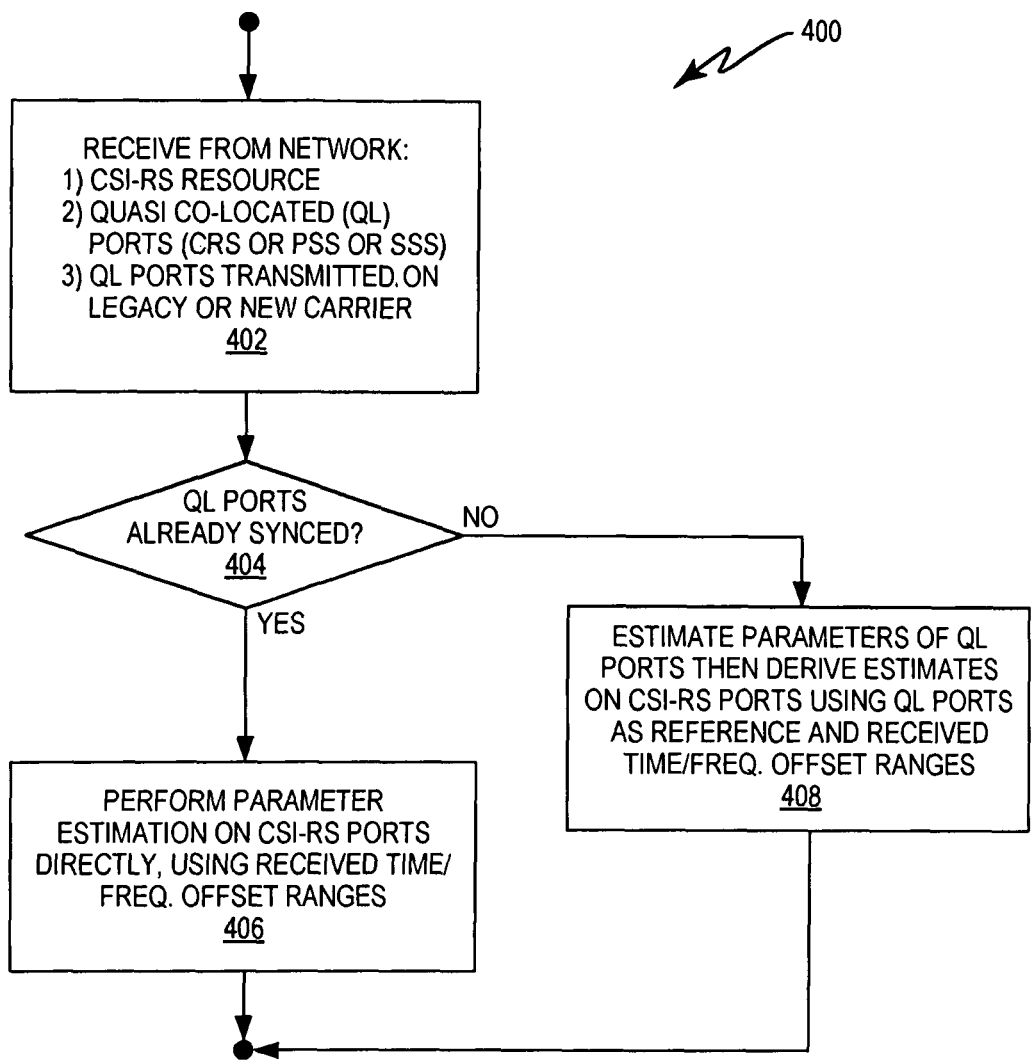
FIG. 4 is a logic flow diagram illustrating example details for one implementation of the method of FIG. 3.

FIG. 4 illustrates an example extension or variation of the method 300, which for convenience of discussion is denominated as "method 400." The method 400 includes the device 12 receiving (Block 402) CSI-RS, receiving quasi co-located port information, and receiving an indication as to whether the quasi co-located ports are on a legacy or new carrier. In this context, CSI-RS are transmitted to the device 12 from one or more "CSI-RS" ports, and the device 12 is provided with information indicating that one or more other ports, e.g., ports used for CRS, PSS, SSS transmission are quasi co-located with the CSI-RS port(s), and is provided with the timing and/or frequency offset information quantifying that relationship.

If the quasi co-located ports are already synchronized (YES from Block 404), processing continues with performing (Block 406) parameter estimation on the CSI-RS port(s) directly, using the received timing and/or frequency offset information, which may include offset range information. Otherwise, processing continues (NO from Block 404) with estimating (Block 408) the parameters of the quasi co-located ports, and then deriving estimates for the CSI-RS ports, using the quasi co-located ports as a reference with respect to the received assistance information.

Figure 5:
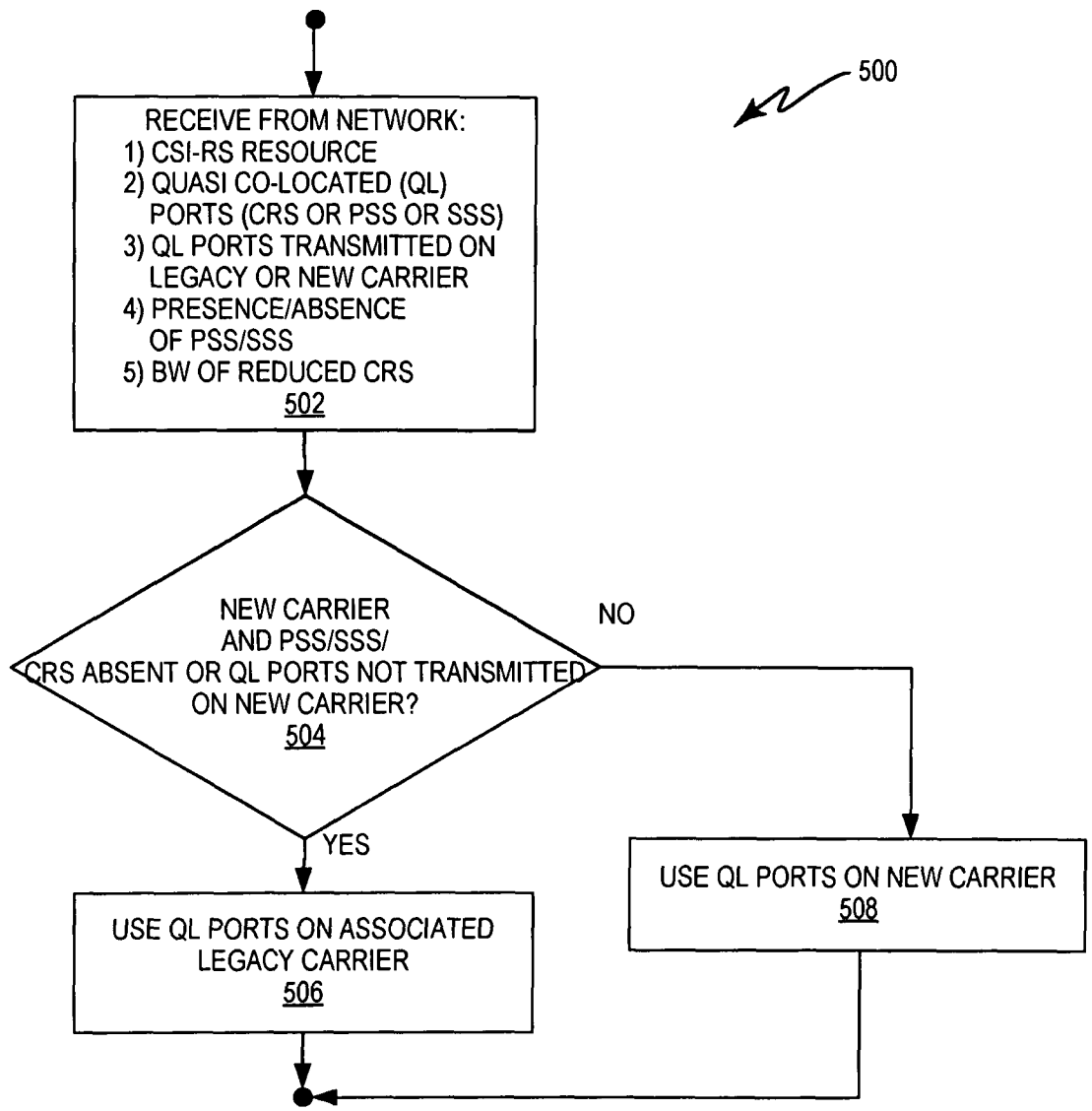
FIG. 5 is a logic flow diagram illustrating example details for another implementation of the method of FIG. 3.

FIG. 5 represents another extension or variation of the method 300, as method 500. Here, the device 12 receives (Block 502) CSI-RS as one reference signal, and receives PSS, SSS and/or CRS and one or more other reference signals transmitted from one or more ports that are quasi co-located with the port(s) used to transmit the CSI-RS. The device 12 further receives indications of whether the quasi co-located ports are transmitted on a legacy or new carrier, an indication about the presence or absence of PSS/SSS/CRS and/or whether CRS on the carrier used for transmission of the CSI-RS of interest are reduced bandwidth CRS.

If the CSI-RS are transmitted on a new carrier and PSS/SSS/CRS are absent and/or CRS on the new carrier are reduced bandwidth (YES from Block 504) and/or the network indicates that the quasi co-located ports are not transmitted on the new carrier, processing continues with using (Block 506) the quasi co-located ports on an associated legacy carrier as the reference for using the assistance data to aid reception of the CSI-RS on the new carrier. Conversely, the NO path from Block 504 includes using (Block 508) the quasi co-located ports on the new carrier—i.e., on the same carrier as used for transmission of the CSI-RS at issue.

Figure 6:
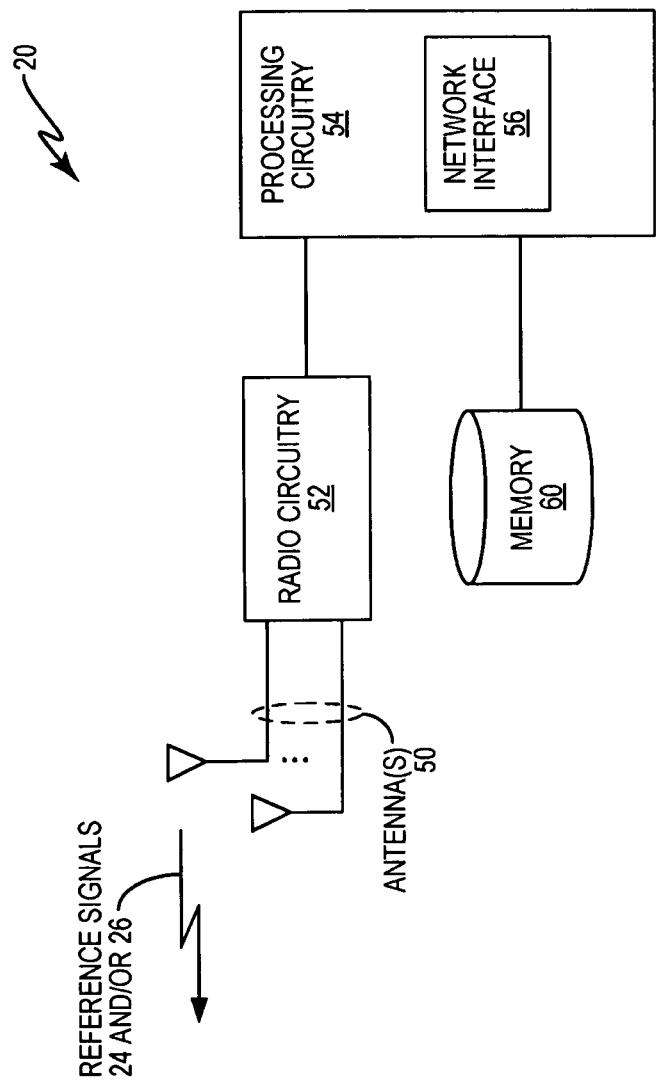
FIG. 6 is a block diagram of one embodiment of a network node that is configured to transmit assistance information, to facilitate reception of a reference signal of interest by a wireless device.

Turning now to network-side aspects of the teachings herein, FIG. 6 illustrates an example base station 20, which is referred to here as a "network node 20" or simply "node 20." Here, the node 20 includes one or more receive/transmit antennas 50, radio circuitry 52, processing circuitry 54, which includes or is associated with a network interface 56, e.g., towards the CN 18, and memory 60. As with the processing circuitry 34 of the device 12, the processing circuitry 54 of the node 20 may comprise one or more microprocessor-based circuits, DSPs, FPGA, ASICs, and/or other digital processing circuitry.

The radio circuitry 52 is configured for sending signals to wireless devices 12 and for receiving signals from such devices. The processing circuitry 54 is operatively associated with the radio circuitry 52 and the memory 60, and is configured to determine a received timing or frequency offset relating a second reference signal 26 to a first reference signal 24, where the first reference signal 24 is transmitted from a first antenna port in the network 10 and the second reference signal 26 is transmitted from a second antenna port in the network 10 that is quasi co-located with the first antenna port. The processing circuitry 54 is further configured to generate assistance information indicating the received timing or frequency offset, and to transmit the assistance information to the wireless device 12, thereby enabling the wireless device 12 to configure a receiver timing or frequency offset used by the wireless device 12 for reception of the second reference signal 26, according to the assistance information.

In an example case, the second reference signal 26 comprises CSI-RS. The processing circuitry 54 is configured to transmit, via the radio circuitry 52, an indication when the CSI-RS are transmitted on a carrier that includes one or more of CRS, a PSS, and an SSS. Here, "when" means "for the case that . . . ." In such a case, the indication can trigger the device 12 to use the received timing and/or frequency offset information to relate the CSI-RS to the CRS, PSS or SSS as received on the same carrier.

In another example, the second reference signal 26 comprises CSI-RS and the processing circuitry 54 is configured to transmit via the radio circuitry 52 an indication when the CSI-RS are transmitted on a second carrier that does not include a PSS or SSS but where the second carrier is aggregated and synchronized with a first carrier that is used for transmission of the first reference signal 24. In such a case, the indication can trigger the device 12 to use the received timing and/or frequency offset information to relate the CSI-RS to the CRS, PSS or SSS as received on the first carrier.

Figure 7:
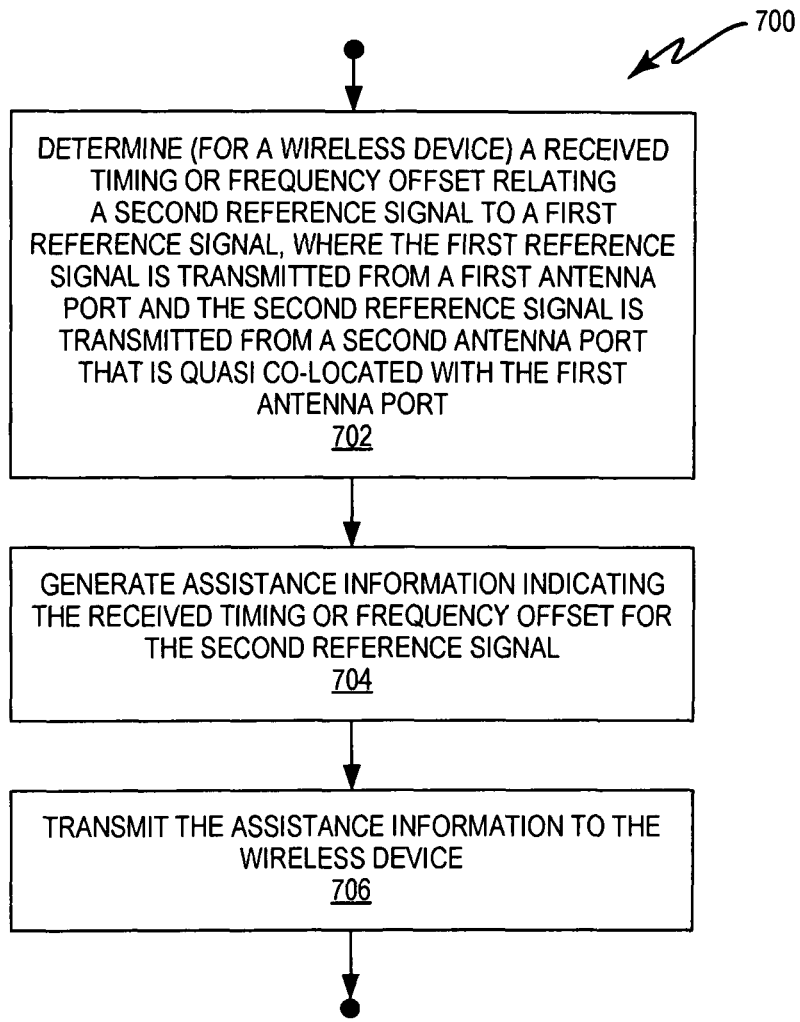
FIG. 7 is a logic flow diagram illustrating one embodiment of a method of assistance information transmission by a network node, to facilitate the reception of a reference signal by a wireless device.

FIG. 7 illustrates a method 700 that may be implemented in the node 20, for example. Although the illustration may suggest a particular ordering of processing actions or steps, it will be understood that one or more processing operations may be performed in a different order than suggested, or performed in parallel, or performed along with other device processing. Further, it should be understood that the method 700 may be repeated as needed, e.g., based on mobility events, changes in the relevant assistance information, etc., and may be applied to different pairings of reference signals and/or to multiple devices 12.

The method 700 facilitates reference signal reception by a wireless device 12 operating in the network 10 and it includes determining (Block 702) a received timing or frequency offset relating a second reference signal 26 to a first reference signal 24, where the first reference signal 24 is transmitted from a first antenna port in the network 10 and the second reference signal 26 is transmitted from a second antenna port in the network 10 that is quasi co-located with the first antenna port. The method 700 further includes generating (Block 704) assistance information indicating the received timing or frequency offset for the second reference signal 26, and transmitting (Block 706) the assistance information to the device 12, thereby enabling the device 12 to configure a receiver timing or frequency offset used by the device 12 for reception of the second reference signal 26, according to the assistance information.

Figure 8:
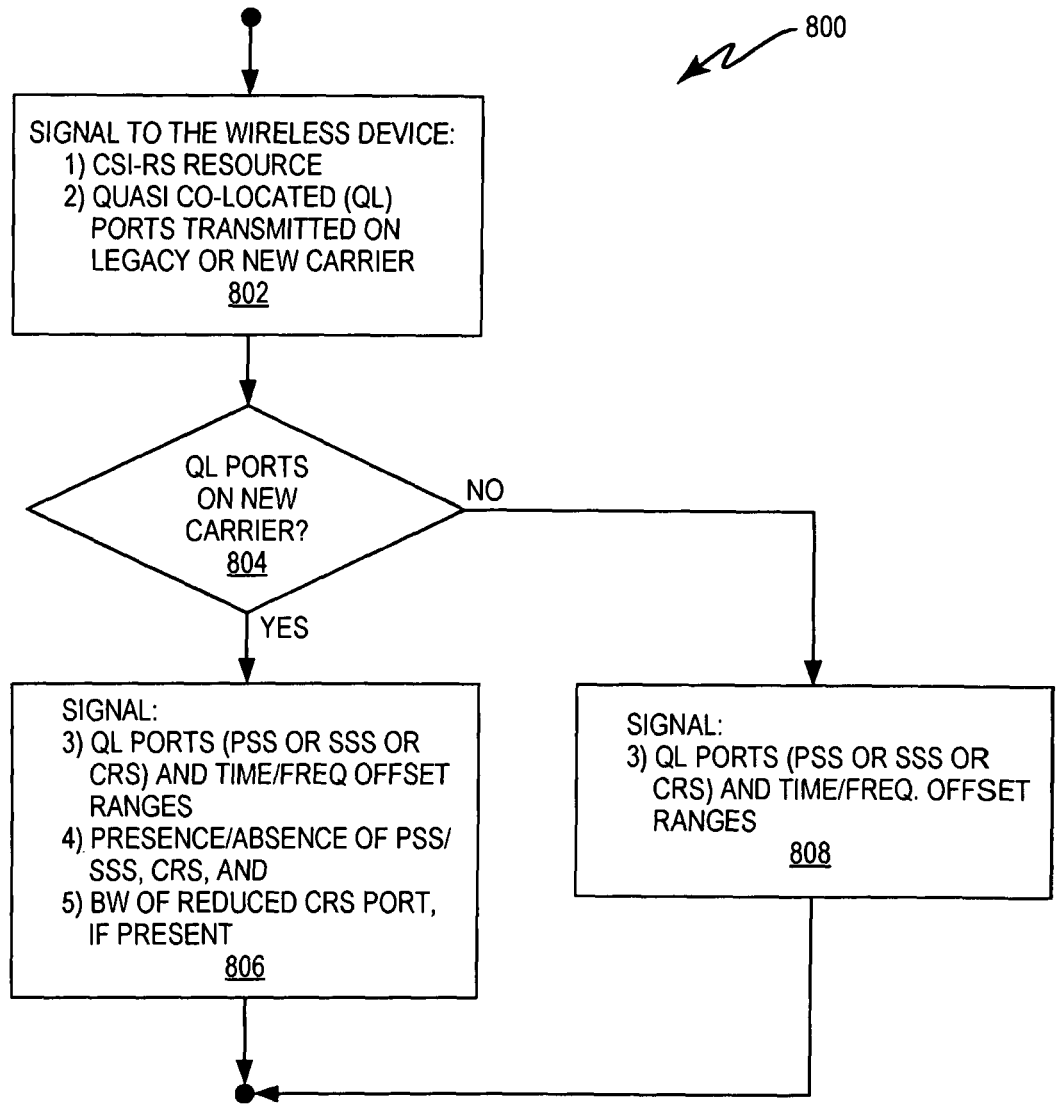
FIG. 8 is a logic flow diagram illustrating example details for one implementation of the method of FIG. 7.

FIG. 8 illustrates an example implementation of the method 700, or a variation thereof, and is denominated as "method 800" for ease of discussion. The method 800 includes signaling (Block 802) to a device 12 CSI-RS resources, and quasi co-located port information, e.g., information indicating whether the quasi co-located ports are on a legacy or new carrier. For example, a CSI-RS port that is quasi co-located with one or more other ports may be associated with a new carrier. If the quasi co-located ports are on a new carrier (YES from Block 804), processing continues with signaling (Block 806) the quasi co-located ports and assistance information, the presence/absence of PSS/SSS on the new carrier and/or whether CRS on the new carrier are reduced bandwidth. Conversely, the NO processing path from Block 804 includes signaling (Block 808) the quasi co-located ports and the assistance information, e.g., time/frequency offset information. Such information may comprise or include information indicating time and/or frequency offset ranges.

From the above examples and corresponding embodiment descriptions, it will be appreciated that the teachings herein enable wireless devices 12, such as user equipments in an LTE network, to obtain quasi co-location information that relates to one or more antenna ports, where such information may be sent using downlink signaling, and where such information enables, among other things, improved channel estimation in the wireless devices 12.

A given device 12 may exploit such assistance information to perform joint, or partly joint, channel estimation for at least some of the channels with similar properties. Stated differently, assistance information indicates which antenna ports may be assumed by the device 12 to have one or more related properties. That is, the UE may be signaled that it is allowed to assume that reference signals on some antenna ports may be used to assist in the channel estimation of a channel for another antenna port. Such signaling may take place over radio resource control, RRC, signaling and/or may be carried by, e.g., signaling grants in Downlink Control Information, DCI.

According to at least some embodiments, the assistance information includes, e.g., information associated with which ports may be used to infer information about which other ports and the degree of differences in the Delay or Doppler profile between such ports. In at least one embodiment, when a device 12 is configured to estimate the channel associated with a CSI-RS resource in order to perform measurements or provide feedback, the device 12 may assume that CSI-RS are quasi co-located with another reference signal port, with respect to at least some long term signal properties such as receive timing and frequency.

The other reference signal port may be a CRS signal or some combination of the PSS, SSS and CRS. The device 12 can be signaled information indicating the relationship between the receive timing of the CSI-RS and one or more of the quasi co-located ports such as the CRS, PSS and SSS. The device 12 also may be informed that the receive timing for the CSI-RS is within a given range of the reference timing for a quasi co-located port. The range may be indicated as an offset less than or equal to T seconds from the reference timing of the quasi co-located port. The quasi co-located port could be the CRS and/or the PSS/SSS. The offset may be signaled in terms of a time unit such as seconds or in terms of a number of symbols, slots or subframes.

The device 12 may also be configured to estimate the channel associated with a CSI-RS resource transmitted on a new carrier type, on which the same reference signal ports as legacy carriers may not exist. The new carrier may or may not be transmitted in a carrier-aggregated mode along with a legacy carrier. When it is transmitted in carrier-aggregated mode, the new carrier may or may not be synchronized with the associated legacy carrier that it is aggregated with. When the new carrier is transmitted standalone or in carrier-aggregated but unsynchronized mode, it will carry a reduced CRS port, PSS and SSS. However, the positions of the PSS/SSS may vary from that of the legacy carrier. When the new carrier is transmitted in synchronized carrier-aggregated mode, it may not carry any PSS/SSS and/or reduced CRS port.

Thus, in some embodiments, the network 10 is configured to signal a wireless device 12, indicating that the carrier on which CSI-RS resource for the device 12 are transmitted is a new carrier type, and further indicating whether the new carrier includes PSS/SSS and/or reduced bandwidth CRS. If the new carrier uses reduced CRS, then the network 10 may also signal the bandwidth of the reduced CRS port. As before, the assistance information may indicate the relationship between the receive timing and/or frequency of the CSI-RS and one or more of the CRS, PSS and SSS. The relationship may take the form of a range with reference to the timing and frequency of those signals within which the timing and frequency of the CSI-RS lies. The range may be indicated as an offset less than or equal to T seconds from the reference timing of the port(s) that are quasi co-located with the CSI-RS port(s). The quasi co-located port(s) could be the ports used for CRS and/or the PSS/SSS. The offset may be signaled in terms of a time unit such as seconds or in terms of a number of symbols, slots or subframes.

In an example case, when the device 12 receives signaling from the network 10 that indicates that the carrier on which its CSI-RS resources are transmitted is a new carrier and that the PSS/SSS and reduced CRS port are present on the carrier, the device 12 uses the reduced CRS port and/or the PSS/SSS as a reference. Conversely, when the device 12 is signaled that the carrier on which its CSI-RS resources are transmitted is a new carrier and that the PSS/SSS are absent on that carrier, the device 12 infers that the new carrier is transmitted in a synchronized carrier-aggregated mode with a legacy carrier. The device 12 then uses the CRS, PSS and/or SSS of the associated legacy carrier for deriving reference timing and frequency, to aid in estimation based on the CSI-RS.

In another example, the device 12 in one or more embodiments receives information regarding the CRS/PSS/SSS ports that are quasi co-located with the CSI-RS of interest, and it is configured to determine whether it is already synchronized in time and frequency to the quasi co-located ports. If it is already synchronized to the quasi co-located ports, it then directly estimates the-timing and frequency of the CSI-RS resource and then performs channel estimation on it. If it is not already synchronized, it first estimates the timing and frequency of the quasi co-located ports and then uses it as a reference to then derive the timing and frequency of the CSI-RS port of interest.

The foregoing embodiments provide various advantages and benefits. For example, various embodiments ensure improved channel estimation by enabling joint channel parameters estimation for CSI-RS when it is applicable. Furthermore, these embodiments allow the device 12 to perform the necessary estimation steps with reduced complexity. Some other specific advantages include but are not limited to these items: the device 12 may exploit the quasi co-located ports for improving estimation of the channel associated to CSI-RS, by exploiting the quasi co-location assumptions; the device 12 may avoid blindly detecting the CSI-RS in cases where the CSI-RS is associated with a legacy carrier or new carrier type; the device 12 may avoid blindly detecting the bandwidth of a reduced CRS port on a new carrier type; and when detecting timing on new carrier types, the device 12 may employ a simplified synchronization algorithm that is subject to time ambiguity. Such ambiguity is reduced or eliminated by exploiting the information that a reference signal "X" is received within a range "Y" of a reference timing that is known from another reference signal on a quasi co-located port. The range Y is smaller than the ambiguity in the timing estimation for reference signal X.

Figure 9:
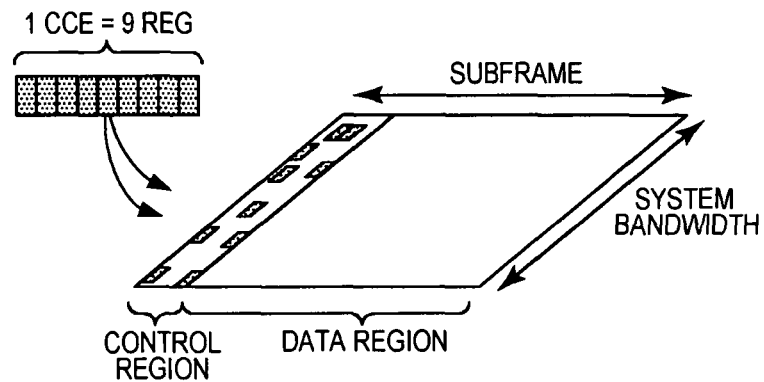
FIGS. 9-11 illustrate the control region and enhanced control regions, as defined for the OFDM carrier used in the downlink of a Long Term Evolution, LTE, network.
Figure 10:
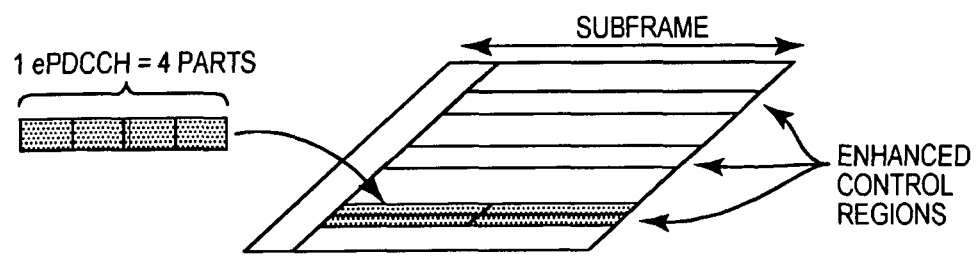
Figure 11:
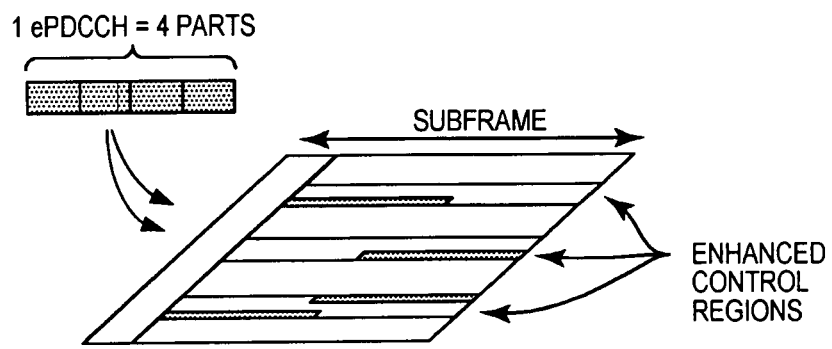

Additionally, embodiments of the teachings herein may be applied similarly to other reference signal types. See FIG. 9, for example, which illustrates a Physical Dedicated Control Channel or PDCCH, as used in LTE. One sees that the PDCCH is transmitted in an initial control region portion of an LTE subframe, where individual PDCCHs comprise one Control Channel Element or CCE, each comprising nine Resource Element Groups or REGs. FIGS. 10 and 11 illustrate an enhanced PDCCH, or ePDCCH, which is transmitted in enhanced control regions that are defined in what would otherwise be portions of the data region. In particular, FIG. 10 illustrates contiguous enhanced control regions, and FIG. 11 illustrates non-contiguous enhanced control regions.

Figure 12:
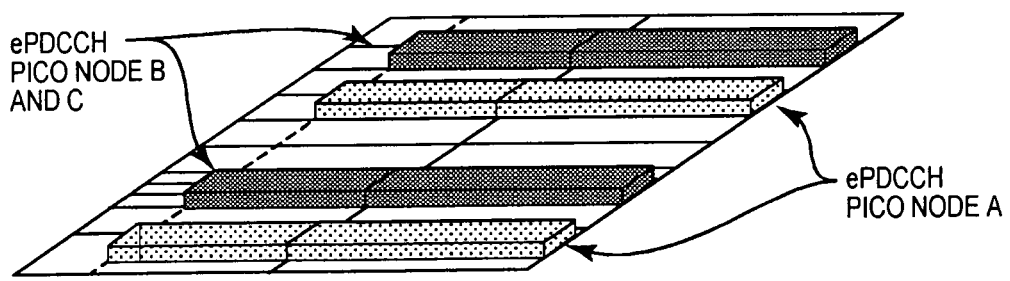
FIG. 12 illustrates an example allocation of enhanced control regions for use with the cell arrangement given in the example of FIG. 1.

The enhanced control regions are used to provide control information targeted to specific devices 12 and device-specific Demodulation Reference Symbols or DMRS are used to enable channel estimation by the targeted devices 12, with respect to the ePDCCH transmissions. This arrangement allows, e.g., advantageous resource reuse. Consider FIG. 12 which relates back to the heterogeneous network deployment shown in FIG. 1. One sees the allocation of different ePDCCHs to different ones of the base stations 20 in each of the cells A, B and C.

With ePDCCH DMRS, each DMRS does not provide sufficient accuracy for timing and frequency tracking. It is recognized herein that one possibility is to at least quasi co-locate the DMRS ports at least with respect to timing and/or frequency, e.g., in terms of shift and/or Doppler spread and/or delay spread, with respect to one or more other reference signal ports. If ePDCCH is carried on a new carrier type, the reference signal used to aid channel estimation may be PSS and/or SSS and/or reduced CRS on the new carrier type. If ePDCCH is transmitted on a conventional carrier, the signal may consist of CRS and/or PSS and/or SSS on that conventional carrier. A timing offset T may be indicated by the network 10 to the 12, for use in tracking the correct CRS with reduced time ambiguity and simplified implementation, i.e., without the need to resolve time ambiguities in time synchronization with the collocated reference signal port that is used to enhance estimation.

Note that although terminology from 3GPP LTE has been used in this disclosure to exemplify the embodiments, this should not be seen as limiting the scope of the invention to only the aforementioned system. Other wireless systems, including WCDMA, WiMax, UMB and GSM, may also benefit from exploiting the ideas described herein. Further, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of reference signal reception in a wireless device configured for operation in a wireless communication network, the method comprising:
   receiving a first reference signal that is transmitted by the wireless communication network from a first antenna port;
   receiving assistance information from the wireless communication network that indicates a received timing or frequency offset of a second reference signal relative to the first reference signal, wherein the second reference signal is transmitted by the wireless communication network from a second antenna port that is quasi co-located with the first antenna port with respect to timing, frequency, Doppler spread and/or delay spread;
   configuring a receiver timing or frequency offset at the wireless device for reception of the second reference signal, according to the assistance information, and
   receiving the second reference signal according to the configured receiver timing or frequency offset.

2. The method of claim 1, wherein the second reference signal comprises Channel State Information Reference Symbols, CSI-RS, that are transmitted from the second antenna port.

3. The method of claim 1, wherein the first reference signal comprises one of Cell specific Reference Symbols, CRS, a Primary Synchronization Signal, PSS, or a Secondary Synchronization Signal, SSS.

4. The method of claim 1, wherein the method includes receiving the first reference signal on a first carrier and receiving the second reference signal on a second carrier that is different than the first carrier.

5. The method of claim 1, wherein the assistance information includes a timing range value or a frequency range value, and wherein configuring the receiver timing or frequency offset at the wireless device according to the assistance information comprises using the timing range value and delay spread of the first reference signal to dimension a search window for detection of the second reference signal, around the received timing of first reference signal, or using the frequency range value and Doppler spread of the first reference signal to dimension frequency detection of the second reference signal, around the received frequency of first reference signal.

6. The method of claim 1, wherein the assistance information indicates one or more of:
   the received timing of the second reference signal in terms of at least one of the following: the first significant channel tap associated with the second reference signal, the number of significant channel taps associated with the second reference signal; and
   a frequency shift relating to the midpoint of the Doppler spectrum for the first and second reference signals.

7. The method of claim 1, wherein the second reference signal comprises Channel State Information Reference Symbols, CSI-RS, and wherein the method further includes receiving an indication that the CSI-RS are transmitted on a carrier that includes one or more of Cell specific Reference Symbols, CRS, a Primary Synchronization Signal, PSS, and a Secondary Synchronization Signal, SSS, and correspondingly selecting at the wireless device any one or more of the CRS, PSS and SSS as the first reference signal, for use in relating the assistance information to the CSI-RS.

8. The method of claim 1, wherein the second reference signal comprises Channel State Information Reference Symbols, CSI-RS, and wherein the method further includes receiving an indication that the CSI-RS are transmitted on a second carrier that does not include a Primary Synchronization Signal, PSS, or a Secondary Synchronization Signal, SSS, or Cell specific Reference Symbols, CRS, and correspondingly selecting at the wireless device a reference signal from a first carrier that is aggregated with the second carrier and is known or assumed by the wireless device to be synchronized with the second carrier when timing and frequency offset is not explicitly included in the received assistance information.

9. A wireless device configured for operation in a wireless communication network and comprising:
   radio circuitry configured to transmit signals to the wireless communication network and to receive signals from the wireless communication network, including a first reference signal transmitted by the wireless communication network from a first antenna port and a second reference signal transmitted by the wireless communication network from a second antenna port that is quasi co-located with the first antenna port; and
   processing circuitry that is operatively associated with a memory and with the radio circuitry, said processing circuitry configured to:
      receive assistance information from the wireless communication network that indicates a received timing or frequency offset of the second reference signal relative to the first reference signal with respect to timing, frequency, Doppler spread and/or delay spread;
      configure a receiver timing or frequency offset used by the radio circuitry for reception of the second reference signal, according to the assistance information; and
      receive the second reference signal via the radio circuitry, according to the configured receiver timing or frequency offset.

10. The wireless device of claim 9, wherein the second reference signal comprises Channel State Information Reference Symbols, CSI-RS, that are transmitted from the second antenna port.

11. The wireless device of claim 9, wherein the first reference signal comprises one of Cell specific Reference Symbols, CRS, a Primary Synchronization Signal, PSS, or a Secondary Synchronization Signal, SSS.

12. The wireless device of claim 9, wherein the wireless device is configured to receive the first reference signal on a first carrier and receive the second reference signal on a second carrier that is different than the first carrier.

13. The wireless device of claim 9, wherein the assistance information includes a timing range value or a frequency range value, and wherein the processing circuitry is configured to configure the receiver timing or frequency offset at the wireless device according to the assistance information by using the timing range value and delay spread of the first reference signal to dimension a search window for detection of the second reference signal, around the received timing of first reference signal, or by using the frequency range value and the Doppler spread of the first reference signal for dimension frequency detection of the second reference signal, around the received frequency of the first reference signal.

14. The wireless device of claim 9, wherein the assistance information indicates one or more of the following:
the received timing of the second reference signal in terms of at least one of the following: the first significant channel tap associated with the second reference signal, and the number of significant channel taps associated with the second reference signal; and
a frequency shift relating to the midpoint of the Doppler spectrum for the first and second reference signals.

15. The wireless device of claim 9, wherein the second reference signal comprises Channel State Information Reference Symbols, CSI-RS, and wherein the processing circuitry is configured to receive an indication that the CSI-RS are transmitted on a carrier that includes one or more of Cell specific Reference Symbols, CRS, a Primary Synchronization Signal, PSS, and a Secondary Synchronization Signal, SSS, and correspondingly select at the wireless device any one or more of the CRS, PSS and SSS as the first reference signal, for use in relating the assistance information to the CSI-RS.

16. The wireless device of claim 9, wherein the second reference signal comprises Channel State Information Reference Symbols, CSI-RS, and wherein the processing circuitry is configured to receive an indication that the CSI-RS are transmitted on a second carrier that does not include a Primary Synchronization Signal, PSS, or a Secondary Synchronization Signal, SSS, and correspondingly select at the wireless device a reference signal from a first carrier that is aggregated with the second carrier and is known or assumed by the wireless device to be synchronized with the second carrier when timing and frequency offset is not explicitly included in the received assistance information.

17. A network node configured for operation in a wireless communication network and comprising:
radio circuitry configured for sending signals to a wireless device and receiving signals from the wireless device; and
processing circuitry operatively associated with the radio circuitry and configured to:
determine a received timing or frequency offset relating a second reference signal to a first reference signal, wherein the first reference signal is transmitted from a first antenna port in the wireless communication network and the second reference signal is transmitted from a second antenna port in the wireless communication network that is quasi co-located with the first antenna port;
generate assistance information indicating the received timing or frequency offset; and
transmit the assistance information to the wireless device, thereby enabling the wireless device to configure a receiver timing or frequency offset used by the wireless device for reception of the second reference signal, according to the assistance information.

18. The network node of claim 17, wherein the second reference signal comprises Channel State Information Reference Symbols, CSI-RS, and wherein the processing circuitry is configured to transmit via the radio circuitry an indication when the CSI-RS are transmitted on a carrier that includes one or more of Cell specific Reference Symbols, CRS, a Primary Synchronization Signal, PSS, and a Secondary Synchronization Signal, SSS.

19. The network node of claim 17, wherein the second reference signal comprises Channel State Information Reference Symbols, CSI-RS, and wherein the processing circuitry is configured to transmit via the radio circuitry an indication when the CSI-RS are transmitted on a second carrier that does not include a Primary Synchronization Signal, PSS, or a Secondary Synchronization Signal, SSS, but where the second carrier is aggregated and synchronized with a first carrier that is used for transmission of the first reference signal.

20. A method of facilitating reference signal reception by a wireless device operating in a wireless communication network, said method performed by a network node in the wireless communication network and comprising:
determining a received timing or frequency offset relating a second reference signal to a first reference signal, wherein the first reference signal is transmitted from a first antenna port in the wireless communication network and the second reference signal is transmitted from a second antenna port in the wireless communication network that is quasi co-located with the first antenna port;
generating assistance information indicating the received timing or frequency offset for the second reference signal; and
transmitting the assistance information to the wireless device, thereby enabling the wireless device to configure a receiver timing or frequency offset used by the wireless device for reception of the second reference signal, according to the assistance information.

21. The method of claim 20, wherein the second reference signal comprises Channel State Information Reference Symbols, CSI-RS, and wherein the method further includes transmitting an indication when the CSI-RS are transmitted on a carrier that includes one or more of Cell specific Reference Symbols, CRS, a Primary Synchronization Signal, PSS, and a Secondary Synchronization Signal, SSS.

22. The method of claim 20, wherein the second reference signal comprises Channel State Information Reference Symbols, CSI-RS, and wherein the method further includes transmitting an indication when the CSI-RS are transmitted on a second carrier that does not include a Primary Synchronization Signal, PSS, or a Secondary Synchronization Signal, SSS, but where the second carrier is aggregated and synchronized with a first carrier that is used for transmission of the first reference signal.

* * * * *